United States Patent
Mordkovich et al.

(10) Patent No.: US 9,315,386 B2
(45) Date of Patent: Apr. 19, 2016

(54) METHOD AND APPARATUS FOR PRODUCING LONG CARBON NANOTUBES

(71) Applicants: Vladimir Zalmanovich Mordkovich, Moscow (RU); Aida Razimovna Karaeva, Moscow (RU); Maxim Alexandrovich Khaskov, Moscow (RU); Eduard Borisovich Mitberg, Ekaterinburg (RU)

(72) Inventors: Vladimir Zalmanovich Mordkovich, Moscow (RU); Aida Razimovna Karaeva, Moscow (RU); Maxim Alexandrovich Khaskov, Moscow (RU); Eduard Borisovich Mitberg, Ekaterinburg (RU)

(73) Assignee: INFRA CARBON LIMITED, Limassol (CY)

( * ) Notice: Subject to any disclaimer, the term of this patent is extended or adjusted under 35 U.S.C. 154(b) by 0 days.

(21) Appl. No.: 14/366,366

(22) PCT Filed: Nov. 28, 2012

(86) PCT No.: PCT/RU2012/000985
§ 371 (c)(1),
(2) Date: Jun. 18, 2014

(87) PCT Pub. No.: WO2013/081499
PCT Pub. Date: Jun. 6, 2013

(65) Prior Publication Data
US 2014/0335009 A1 Nov. 13, 2014

(30) Foreign Application Priority Data
Nov. 29, 2011 (RU) .................. 2011148461

(51) Int. Cl.
*C01B 31/02* (2006.01)
*B01J 19/24* (2006.01)
*B82Y 30/00* (2011.01)
*B82Y 40/00* (2011.01)

(52) U.S. Cl.
CPC ......... *C01B 31/0233* (2013.01); *B01J 19/2415* (2013.01); *B82Y 30/00* (2013.01); *B82Y 40/00* (2013.01); *C01B 31/024* (2013.01); *B01J 2219/00166* (2013.01); *B01J 2219/19* (2013.01); *C01B 2202/34* (2013.01)

(58) Field of Classification Search
CPC .................. B01J 19/2415; B01J 2219/00166; B01J 2219/19; C01B 31/024; C01B 31/0233; C01B 2202/34; B82Y 30/00; B82Y 40/00
USPC ........ 423/447.1–447.3, 445 B; 977/742–754, 977/842–848
See application file for complete search history.

*Primary Examiner* — Daniel C McCracken
(74) *Attorney, Agent, or Firm* — Weiner & Burt, P.C.; Irving M. Weiner; Pamela S. Burt

(57) ABSTRACT

The present invention is used to produce long carbon nanotubes used, for example, in automobile and/or aircraft industry. An object of the invention is to obtain bundles of multi-walled and well oriented nanotubes of sufficient length and provide stability of continuous nanotubes producing process. The method comprises introducing a carbon-bearing component, a promoter and a precursor of a carbon nanotube growth catalyst in a carrier gas stream to form a mixture of these components; passing said mixture through the a reactor heated to an operating temperature of 1000° C. to 1200° C. and removing nanotubes formed in the reactor into a product receiver. The mixture is fed in the reactor from the bottom upwards at a linear flow velocity of 50 mm/c to 130 mm/c. When the temperature in the reactor reaches said operating temperature, the linear flow velocity of the mixture is decreased to 4-10 mm/c, and the linear flow velocity is increased to 30-130 mm/c at the outlet of the reactor. The apparatus comprises means for introducing the carbon-bearing component, the promoter and the precursor of the carbon nanotube growth catalyst in the carrier gas stream, a vertical reactor with a working chamber, means for heating the working chamber to the operating temperature, means for delivering the mixture to the working chamber of the reactor and means for removing products from the working chamber. The chamber is made of three successive sections, namely a lower inlet 16 section, a middle 17 section and an upper outlet 18 section and the diameter of the lower section 16 is ⅕ to ⅓ of the diameter of the middle section 17, while the diameter of the upper section 18 is from ¼ to ⅓ of the diameter of the middle section 17.

7 Claims, 3 Drawing Sheets

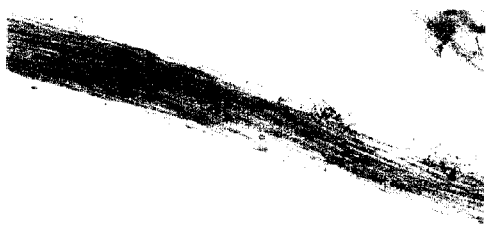
FIG. 3A
FIG. 3B
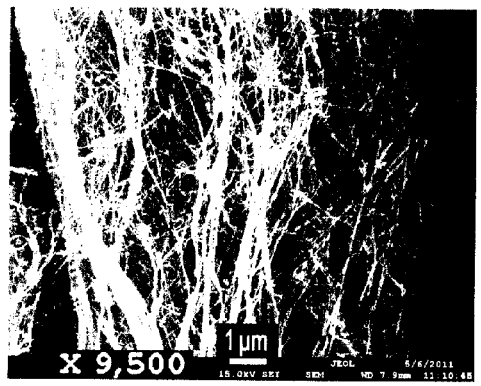
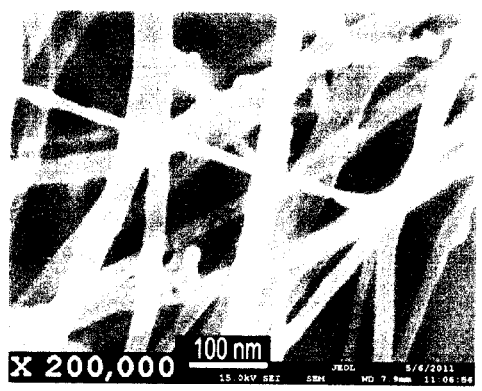
FIG. 4A
FIG. 4B

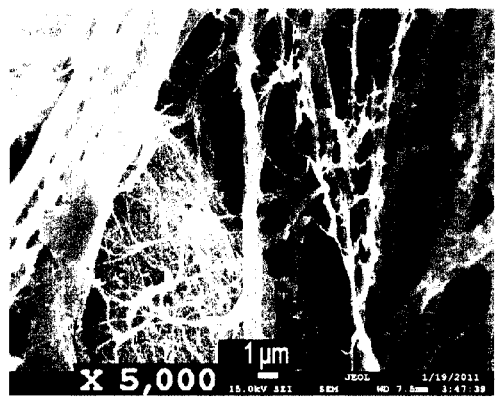 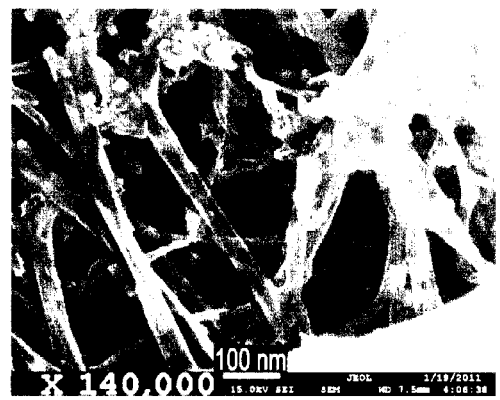
FIG. 5A FIG. 5B
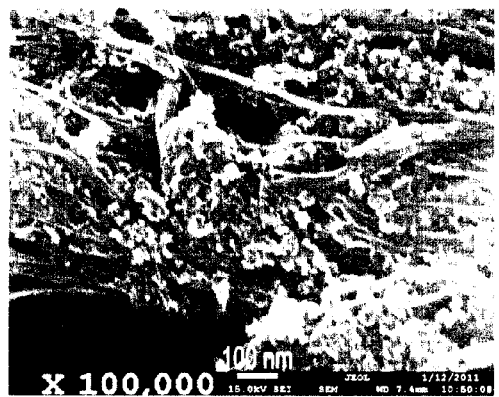
FIG. 6

METHOD AND APPARATUS FOR PRODUCING LONG CARBON NANOTUBES

FIELD OF THE INVENTION

The present invention relates to the field of nanotechnology and production of nanostructures, specifically to a method and apparatus for producing carbon nanotubes and can be used to produce high-strength composite carbon fibers and components of composite materials used in automobile and/or aircraft industry.

BACKGROUND OF THE INVENTION

It is well known that carbon nanotubes are single- or multi-walled cylindrical structures, in which each of the layers of the cylindrical wall is a graphite-like sheet of carbon atoms (graphene).

Carbon nanotubes have a complex of unique properties due to their chemical and structural characteristics including the small size of the diameter, cylindrical structure and high form-factor (the ratio of the length of a carbon nanotube to the diameter thereof). Carbon nanotubes are characterized by extraordinary high strength (about 150 GPa), Young's modulus (about 600 GPa), low density (about 2 g/cm$^3$), high chemical stability, thermal and electrical conductivities.

Important geometric characteristics of carbon nanotubes are a number of carbon monomolecular layers/walls, an outer diameter, a diameter of the inner hole, a length, a form-factor.

Main methods for producing carbon nanotubes are arc, laser, electrolysis and catalytic methods. It is commonly used in industry the catalytic method which enables to use a relatively simple equipment, provide a continuous synthesis mode, produce high-yield carbon nanotubes (Ando Y., Zhao X., Sugai T., Kumar M. Growing carbon nanotubes//Materials Today, 2004, pp. 22-29). The essence of the method consists in that a carbon-bearing gas (carbon precursor) is decomposed over a metallic catalyst at the temperature of 500° C. to 1500° C. The process is performed by one of two methods: by growing nanotubes on a substrate or in a gas stream (Mordkovich V. Z. Ultrahigh-strength carbon nanofibers//Chemical industry today, 2003, No. 2, pp. 12-21).

Carbon nanomaterials, in particular fibers on basis of carbon nanotubes, are among the most promising materials for various applications, namely for using in the manufacture of sensors, displays, lithium-carbon batteries for computers and cell phones, starting capacitors for electronics, biomaterials, sorption materials and hydrogen storage systems. However, carbon nanotubes have the most actual application in development of structural and functional composite materials for different purposes and high-strength and high-modulus carbon complex filaments. The main problem of using carbon nanotubes at the macroscopic level lies in their limited length. Therefore, a development of a method for growing long carbon nanotubes (not less than several millimeters) is a necessary condition for the appearance of the corresponding class of structural and functional materials.

It is known in the art a method for producing bundles of long oriented nanofibers (RU Patent No. 2393276, published on Jun. 27, 2010), consisting in that a carbon nanofiber growth catalyst, after its high-temperature pretreatment, is introduced in a reactor, the reaction zone is heated to the temperature of pyrolysis of a carbon-bearing steam-gas mixture fed in the reactor and comprising promoters on the base of sulfur- and oxygen-containing compounds, the reaction zone is held at the temperature of pyrolysis till said bundles are formed, then the reactor is cooled. A linear feed velocity of the carbon-bearing steam-gas mixture is in the range from 20 to 300 mm/s. The high-temperature pretreatment of the catalyst is carried out in a stream of air or inert gas at the temperature of 1200 to 1300° C., the pyrolysis temperature is in the range from 1000 to 1150° C., and the carbon-bearing gas mixture is a mixture consisting of hydrogen, aromatic compounds and paraffins and/or olefins, where a volume of paraffins and/or olefins is less than 30% of the overall volume of gases. The main disadvantage of this method is that the process is not continuous. Moreover, not all the nanofibers composing bundles are nanotubes because not all of them have a cylindrical structure.

The technically closest to the claimed method is a method for producing of long single-walled carbon nanotube strands by catalytic decomposition of n-hexane containing 0.45 wt % of thiophene as a promoter in a vertical flow reactor, wherein the catalyst (ferrocene) is introduced in the form of suspension in liquid hydrocarbon (WO/2003/072859, IPC C01B 31/02, 2003). Disadvantages of the closest method are limited possibility of continuous removal of the obtained nanotubes from the reactor because the nanotubes are immobilized in the form of a "flexible smoke" at the bottom portion of the reactor and can be removed only by drawing and twisting, and also a single-walled structure of obtained materials, which makes difficult their further chemical and thermal treatment required for producing high-strength composite carbon fibers and composite materials using the obtained materials. Moreover, the known method does not provide sufficient quality of the obtained product because the nanotubes of above 5 cm in length are hardly oriented in the resulting strands, i.e. nanotubes are not sufficiently parallel in the strands and even tangled.

The closest to the claimed apparatus is an apparatus for producing carbon nanotubes, comprising means for introducing a carbon-bearing component, a promoter and a precursor of a carbon nanotube growth catalyst into a carrier gas stream to form a mixture of these components; a vertical reactor having a working chamber, means for heating the working chamber to operating temperature, means for delivering said mixture to the working chamber of the reactor and means for removing products from the working chamber (WO/2003/072859, IPC C01B 31/02, 2003). This known apparatus has the same disadvantages as the closest method.

SUMMARY OF THE INVENTION

A main object of the present invention is to provide a high-performance method and apparatus for producing carbon nanotubes, which method and apparatus would provide producing multi-walled nanotubes of sufficient length at sufficient quality of bundles formed from the nanotubes by forming the bundles with the nanotubes well oriented and not tangled, as well as would provide stability of continuous process for producing the quality product.

A further object of the present invention is to provide sufficient quality of the resulting product by providing stable dosing of the introduced components used for synthesis of the nanotubes.

The main object of the present invention is achieved by that in the method for producing carbon nanotubes, comprising introducing a carbon-bearing component, a promoter and a precursor of a carbon nanotube growth catalyst in a carrier gas stream to form a mixture of these components, passing said mixture through a reactor heated to an operating temperature of 1000° C. to 1200° C. and removing nanotubes formed in the reactor into a product receiver, according to the present invention, the mixture is fed into the reactor from the bottom upwards at a linear flow velocity of 50 mm/c to 130 mm/c, wherein when the temperature in the reactor reaches the said operating temperature, the linear flow velocity of the mixture is decreased to 4-10 mm/c, and the linear flow velocity is increased to 30-130 mm/c at the outlet from the reactor.

Said further object of the present invention is achieved in the method according to the present invention by that introducing the carbon-bearing component, the promoter and the precursor of the carbon nanotube growth catalyst in the carrier gas stream is performed by saturating the carrier gas stream with said three components with the result that the carbon-bearing component, the promoter and the precursor of the carbon nanotube growth catalyst are in gas phase immediately after introducing them in the carrier gas stream. Such method for introducing the components into the carrier gas stream provides sufficiently exact and stable dosing of the components.

In the method according to the present invention, hydrogen is preferably used as the carrier gas. Carbon-bearing nonaromatic compounds, such as methane, ethane, propane, acetylene, ethylene, methanol, ethanol or mixtures thereof, are preferably used as the carbon-bearing component. Sulfur-bearing compounds, such as thiophene, are preferably used as the promoter. Volatile compounds of metals of group VIII, such as ferrocene or cobalt carbonyl, are preferably used as the catalyst precursor. Content of the metal of group VIII in the mixture of the carrier gas, the carbon-bearing component, the promoter and the catalyst precursor is preferably 0.03 to 0.3% by weight.

The main object of the present invention is also achieved by that in the apparatus for producing carbon nanotubes, comprising means for introducing a carbon-bearing component, a promoter and a precursor of a carbon nanotube growth catalyst into a carrier gas stream to form a mixture of these components; a vertical reactor having a working chamber, means for heating the working chamber to operating temperature, means for delivering said mixture to the working chamber of the reactor and means for removing products from the working chamber, according to the present invention, the working chamber is made of three successive sections, namely a lower inlet section, a middle section and an upper outlet section, wherein the diameter of the lower inlet section is from 1/5 to 1/3 of the diameter of the middle section and the diameter of the upper outlet section is from 1/4 to 1/3 of the diameter of the middle section.

Said further object of the present invention is achieved in the apparatus according to the present invention by that the means for introducing the carbon-bearing component, the promoter and the precursor of the carbon nanotube growth catalyst into the carrier gas stream is made in the form of a saturator or several saturators.

BRIEF DESCRIPTION OF THE DRAWINGS

The present invention is illustrated by drawings and photographs:

FIG. 3 are photographs of a product obtained by the method according to the present invention;

FIGS. 4 to 6 are photographs taken using scanning electron microscopy and showing products obtained according to Examples 1, 2 and 5 as described below.

DETAILED DESCRIPTION OF THE INVENTION

Figure 2:
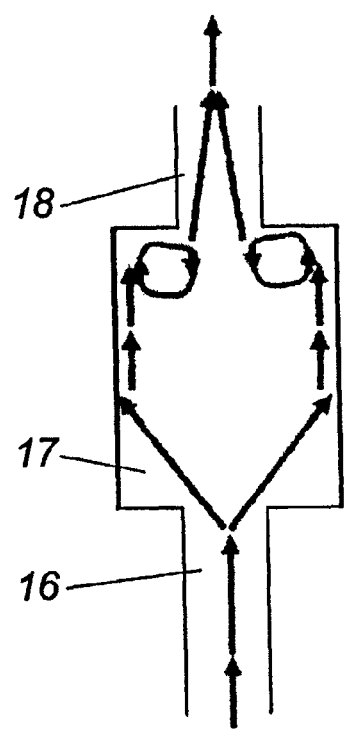
FIG. 2 is a diagram of motion of the gas stream in the reactor of the apparatus according to the present invention.

As a result of research and study of literature, the inventors of the present invention have ascertained that, to achieve the above-mentioned main object, it is necessary not only to use the carbon-bearing components, the catalyst and the promoter in optimum proportion at optimum synthesis temperature (many inventors in this field make use of similar optimization with different results), but also to permit the catalyst to be in the reaction zone during sufficiently long time to provide growth of the carbon nanotubes, but this period of time should not be above a limit beyond which there are disorientation of the nanotubes in the bundles and fouling of the nanotubes with parasitic deposits. It has been determined that such dwell time is technically feasible when using a reactor with a variable diameter chamber in which the stream moves upward. In such reactor, the gas mixture stream enters the first (lower) chamber section of small diameter at high flow velocity, where the catalyst precursor is decomposed to form catalyst nanoparticles, on the surfaces of which the nanotube growth is initiated. Then, the stream flow velocity is decreased in the second (middle) chamber section of large diameter, and the stream flow velocity is increased at the inlet of the third (upper) chamber section of small diameter whereby vortexes are formed in the upper part of the middle chamber section (FIG. 2). The presence of these vortexes in the middle section of the reactor chamber causes growth of the nanotubes. As far as nanotube agglomerates reaches a certain length, the agglomerates acquire significant windage and so no longer stably hold in the vortexes and are removed by the outgoing stream into the product receiver.

The ranges of the gas mixture linear velocities in the reactor, according to the present invention, are selected based on experimental data, the main of which are shown in Table 1 below.

The range of the concentrations of metal of group VIII in the gas mixture fed in the reactor, according to the present invention, are also selected based on experimental data, the main of which are shown in Table 1 below. It has been determined that if the metal concentration is less than 0.03% by weight, the product yield is very low, and when the concentration increases over 0.3% by weight, there are not further increase of the product yield and improvement in quality of the product. Therefore, since volatile compounds of the metals of group VIII as the catalyst are expensive, increase of content of these compounds is unreasonable when the metal content is higher than 0.3% by weigh.

The ratios of the diameters of the reactor sections, according to the present invention, are also selected based on of experimental data, the main of which are shown in Table 2. It has been determined herein that if the diameter of the lower inlet section of the reactor is too small or too large (less than 1/5 (one fifth) or larger than 1/3 (one third) of the diameter of the middle section), the gas stream vortexes required as explained above are not formed in the middle section. Moreover, if the diameter of the upper outlet section of the reactor is less than 1/4 (one fourth) of the middle section diameter, the forming carbon product falls from the vortexes in the middle section and cannot come to the upper section, i.e. the product sticks in the middle section. If the diameter of the upper outlet section of the reactor is larger than 1/3 of the diameter of the middle section, the vortexes are not formed in the middle section.

Moreover, it is important that components involved in the nanotube synthesis (the carbon-bearing component, the promoter and the catalyst precursor) are in the gas phase immediately after introducing them in the carrier gas stream so as to provide exact dosing of them and avoid undesirable chemical processes before the gas mixture reaches the reactor. In the method according to the present invention, known methods of saturation by means of a saturator or several saturators of known type is used to introduce said components into the carrier gas stream, which components are initially in solid or liquid form. The catalyst precursor (ferrocene) in solid form is put into a saturator cartridge blown by the carrier gas stream, and this cartridge is blown by the carrier gas at a predetermined high temperature. Liquid components (alcohol as the carbon-bearing component and thiophene as the promoter) are put into a saturator of flushing vessel type, and the carrier gas is saturated by bubbling through the liquid layer at a predetermined high temperature. Saturators of various known types suitable for saturating the carrier gas with said components can be used. Said saturation processes can be carried out in one saturator or in several saturators arranged successively.

Figure 1:
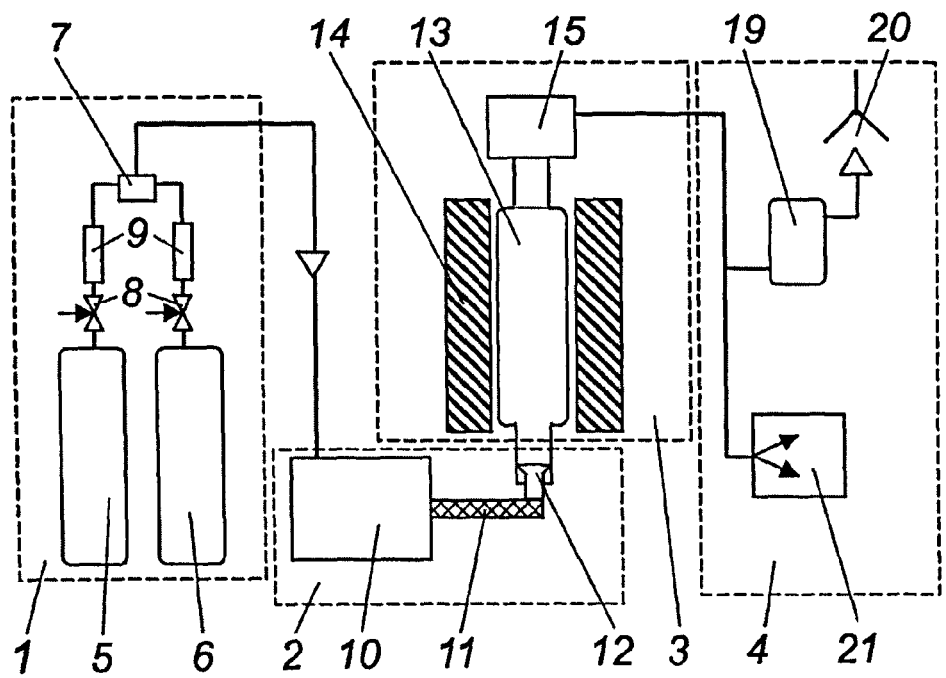
FIG. 1 shows a schematic diagram of the apparatus for producing carbon nanotubes according to the present invention.

The apparatus according to the present invention (FIG. 1) comprises a gas supply unit 1, a saturation unit 2, a reactor unit 3 and a spent gas removal unit 4. The gas supply unit 1 comprises an inert gas vessel 5, a carrier gas vessel 6 and a gas mixer 7. Each of the vessels 5, 6 is provided with a valve 8 to fine adjust the gas flow rate. A flow meter 9 is arranged between each valve 8 and the gas mixer 7.

The saturation unit 2 comprises means made in the form of a saturator 10 for introducing the carbon-bearing component, the promoter and the catalyst precursor into the carrier gas stream and means made in the form of a constant-temperature line 11 with a gas dispenser 12 for delivering the gas mixture formed in the saturator 10 to the reactor unit 3.

The reactor unit 3 comprises a quartz vertical flow reactor 13, an electric furnace 14 having an electronic control unit and used as means for heating the working chamber of the reactor 13 to the operating temperature, and a product receiver 15 used as means for removing products from the working chamber of the reactor 13. The working chamber of the reactor 13 is made of vertically ranged successive sections, namely a lower inlet section 16, a middle section 17 and an upper outlet section 18. The diameter of the lower section 16 is from ⅕ to ⅓ of the diameter of the middle section 17, while the diameter of the upper section 18 is from ¼ to ⅓ of the diameter of the middle section 17. The gas dispenser 12 is placed at the inlet of the lower inlet section 16 and the product receiver 15 is placed at the outlet of the upper outlet section 18.

The spent gas removal unit 4 comprises a trap 19 with an exhaust system 20 and a forepump 21.

The method according to the present invention is carried out by the claimed apparatus in the following way. Ultrapure hydrogen (99.9999%) is used as the carrier gas, ethanol is used as the carbon-bearing component, thiophene is used as the promoter and ferrocene is used as the catalyst precursor. According to the appended claims, other compounds can also be used as said components.

Ferrocene and ethanol with thiophene are put in the saturator 10. The apparatus is checked for tightness and the reactor 13 is purged within 15 minutes with stream of inert gas, such as argon, incoming from the vessel 5. The reactor 13 is heated by means of the electric furnace 14 provided that the maximum operating temperature is 1200° C. The temperature is controlled by means of the electronic furnace control unit. After the reactor is purged, the temperature of the inert gas stream in the reaction zone (in the middle section 17 of the reactor 13) is increased to the synthesis operating temperature (1000-1200° C.) at rate of 10° C./min.

Once the temperature in the middle section 17 reaches the synthesis operating temperature, hydrogen is fed from the vessel 6 into the reactor 13 at rate of 200-600 ml/min and supply of the inert gas is cut off. The hydrogen stream enters the saturator 10 where passes sequentially through the mixture of ethanol with thiophene and then through ferrocene. As a result, the hydrogen gas stream is saturated with said reactants to required concentrations, and the obtained gas mixture of hydrogen, ethanol, thiophene and ferrocene is directed into the lower inlet section 16 of the reactor 13 through the heated constant-temperature line 11. The saturation vapor pressure of ethanol and ferrocene are maintained by means of the saturator 10.

The gas mixture is fed into the lower inlet section 16 of the reactor 13 at the linear velocity of 50 mm/s to 130 mm/s. The temperature of the gas mixture increases in this section and reaches the synthesis operating temperature at the inlet of the middle section 17. Due to the enlarged diameter of the middle section 17, the linear velocity of the gas mixture stream decreases to 4-10 mm/c in the middle section 17, and due to the smaller diameter of the upper outlet section 18, the linear velocity of the gas increases to 30-130 mm/c at the inlet of the upper outlet section 18.

The synthesis is carried out at the temperature of 1000-1200° C. and atmospheric pressure within 5-60 min. The obtained fibrous product of the carbon nanotubes is collected in the product receiver 15 from which the product is periodically or continuously discharged.

Microphotographs of the long carbon nanotubes obtained by the method according to the present invention are shown in FIG. 3. FIG. 3A (a microphotograph taken using transmission electron microscopy) shows an image of a single cylindrical multi-walled carbon nanotube, the inner diameter of which is 6 nm and the outer diameter is 7 nm. FIG. 3B (a microphotograph taken using scanning electron microscopy) shows an image of well-oriented bundles of the nanotubes.

It is described below examples illustrating production of carbon nanotubes but not intending to limit the present invention. Data of Examples 1-13 are shown in Table 1, and data of Examples 14-20 are shown in Table 2. The following designations are used in the Tables:

Q—flow rate of the gas mixture (hydrogen, ethanol, thiophene, ferrocene) coming into the lower inlet section 16 of the reactor 13;

L—length of oriented bundles of the obtained nanotubes;

D—outer diameter of the obtained nanotubes.

The carrier gas (hydrogen) stream was saturated with vapors of ethanol, thiophene and ferrocene in the saturator 10 to the concentrations specified in Tables 1, 2. The concentrations of the components are specified in relation to the total weight of the gas mixture coming into the reactor 13 (sum of weights of hydrogen, ethanol, thiophene and ferrocene). The concentration of the metal (iron) is specified parenthetically after the concentration of ferrocene. The synthesis operating temperature was 1150° C. in all the examples.

According to Examples 1-13 (Table 1), carbon nanotubes were obtained using the apparatus according to the present invention when the ratio of diameters of the lower inlet and upper outlet sections 16, 18 to the diameter of the middle section 17 was 0.29.

According to Examples 14-20 (Table 2), carbon nanotubes were obtained using the reactor having various ratios of its section diameters. In the Table 2, the ratio of the diameter of the lower inlet section 16 to the diameter of the middle section 17 (column "Lower section") and the ratio of the diameter of the upper outlet section 18 to the diameter of the middle section 17 (column "Upper section") are specified parenthetically after the linear velocity of the gas mixture flow. Example 18 is identical to Example 8 (Table 1).

TABLE 1

Parameters of synthesis and main characteristics of the carbon nanotubes when the ratio of the diameters of the lower and upper sections to the diameter of the middle section is 0.29

| Example number | Concentration of components, wt. % alcohol:thiophene: ferrocene (Fe) | Q, ml/min | Linear velocity of the gas mixture flow in the reactor, mm/s | | | Characteristics of nanotubes | |
|---|---|---|---|---|---|---|---|
| | | | Lower section | Middle section | Upper section | L, cm | D, nm |
| 1 | 61.1:0.6:0.07 (0.032) | 400 | 64 | 5 | 64 | ≥5 | 7-34 |
| 2 | 60.8:0.6:0.6 (0.276) | 200 | 32 | 3 | 32 | ≥5 | 12-43 |
| 3 | 60.8:0.6:0.6 (0.276) | 600 | 97 | 8 | 97 | ≥5 | 8-30 |
| 4 | 60.8:0.6:0.6 (0.276) | 400 | 64 | 5 | 64 | ≥5 | 8-32 |
| 5 | 60.8:0.6:0.6 (0.276) | 824 | 132 | 11 | 132 | ≤5 | 5-20 |
| 6 | 61.0:0.15:0.6 (0.276) | 400 | 64 | 5 | 64 | ≥5 | 8-33 |
| 7 | 60.4:1.2:0.6 (0.276) | 400 | 64 | 5 | 64 | ≥5 | 6-24 |
| 8 | 61.0:0.3:0.6 (0.276) | 400 | 64 | 5 | 64 | ≥5 | 6-30 |
| 9 | 60.4:0.6:1.2 (0.552) | 400 | 64 | 5 | 64 | ≥5 | 11-46 |
| 10 | 61.1:0.6:0.1 (0.046) | 400 | 64 | 5 | 64 | ≥5 | 8-33 |
| 11 | 61.0:0.6:0.3 (0.138) | 400 | 64 | 5 | 64 | ≥5 | 7-36 |
| 12 | 60.0:0.6:2.4 (1.104) | 400 | 64 | 5 | 64 | — | — |
| 13 | 60.0:2.4:0.6 (0.276) | 400 | 64 | 5 | 64 | — | — |

Example 1

A carbon fibrous product of large quantity of oriented bundles of carbon nanotubes was obtained (FIG. 4). FIG. 4A shows oriented carbon bundles, FIG. 4B shows long carbon nanotubes.

Example 2

A carbon fibrous product of oriented bundles of carbon nanotubes was obtained. Parasitic deposits were formed on the carbon bundles and nanotubes (FIG. 5). FIG. 5A shows oriented carbon bundles, FIG. 5B shows long carbon nanotubes.

Examples 3-4

A carbon fibrous product of oriented bundles of long carbon nanotubes was obtained.

Example 5

A carbon fibrous product of oriented bundles of long carbon nanotubes was obtained, wherein the nanotubes are coated abundantly with agglomerates of parasitic deposits (FIG. 6).

Example 6

A carbon fibrous product of oriented bundles of long carbon nanotubes was obtained.

Example 7

A carbon fibrous product of oriented bundles of long carbon nanotubes was obtained. There are parasitic deposits.

Examples 8-11

A carbon fibrous product of oriented bundles of long carbon nanotubes was obtained.

Example 12

A lot of flaky carbon non-fibrous product was obtained. Oriented bundles of carbon nanotubes were not formed.

Example 13

A carbon non-fibrous product deposited as a film in the upper part of the middle section of the reactor and as carbon deposits in the bottom part of the middle section of the reactor was obtained. Oriented bundles of carbon nanotubes were not formed.

TABLE 2

Parameters of synthesis and main characteristics of the carbon nanotubes at various ratios of the diameters of the reactor sections

| Example number | Concentration of components, wt. % alcohol:thiophene: ferrocene (Fe) | Q, ml/min. | Linear velocity of the gas mixture flow in the reactor, mm/s (ratio of the section diameters) | | | Characteristics of nanotubes | |
|---|---|---|---|---|---|---|---|
| | | | Lower section | Middle section | Upper section | L, cm | D, nm |
| 14 | 61.0:0.3:0.6 (0.276) | 400 | 154 (0.18) | 5 | 130 (0.25) | <<1 | 5-20 |
| 15 | 61.0:0.3:0.6 (0.276) | 400 | 130 (0.20) | 5 | 140 (0.23) | ≥5 | 5-20 |

TABLE 2-continued

Parameters of synthesis and main characteristics of the carbon nanotubes at various ratios of the diameters of the reactor sections

| Example number | Concentration of components, wt. % alcohol:thiophene: ferrocene (Fe) | Q, ml/min. | Linear velocity of the gas mixture flow in the reactor, mm/s (ratio of the section diameters) | | | Characteristics of nanotubes | |
|---|---|---|---|---|---|---|---|
| | | | Lower section | Middle section | Upper section | L, cm | D, nm |
| 16 | 61.0:0.3:0.6 (0.276) | 400 | 130 (0.20) | 5 | 130 (0.25) | ≥5 | 6-30 |
| 17 | 61.0:0.3:0.6 (0.276) | 400 | 80 (0.25) | 5 | 130 (0.25) | ≥5 | 6-30 |
| 18 (8) | 61.0:0.3:0.6 (0.276) | 400 | 64 (0.29) | 5 | 64 (0.29) | ≥5 | 6-30 |
| 19 | 61.0:0.3:0.6 (0.276) | 400 | 50 (0.31) | 5 | 30 (0.33) | ≥5 | 6-30 |
| 20 | 61.0:0.3:0.6 (0.276) | 400 | 45 (0.35) | 5 | 25 (0.39) | <<1 | 40-100 |

Example 14

A carbon fibrous product of bundles of the carbon nanotubes having insufficient length was obtained.

Example 15

A carbon fibrous product having insufficient quantity of the nanotubes not forming oriented bundles was obtained.

Examples 16-19

A carbon fibrous product of oriented bundles of the long carbon nanotubes was obtained.

Example 20

A carbon fibrous product having insufficient quantity of the carbon nanotubes, the length of which is also insufficient.

The invention claimed is:

1. A method of producing carbon nanotubes, comprising the steps of:
   introducing a carbon-bearing component, a promoter and a precursor of a carbon nanotube growth catalyst in a carrier gas stream to form a mixture of these components;
   passing said mixture through a reactor heated to an operating temperature of 1000° C. to 1200° C.; and
   removing nanotubes formed in the reactor into a product receiver:
   wherein said mixture is fed into the reactor from the bottom upwardly at a linear flow velocity of 50 mm/s to 130 mm/s, wherein when the temperature in the reactor reaches the said operating temperature, the linear flow velocity of the mixture is decreased to 4-10 mm/s, and the linear flow velocity is increased to 30-130 mm/s at the outlet from the reactor.

2. The method according to claim 1, wherein introducing the carbon-bearing component, the promoter and the precursor of the carbon nanotube growth catalyst in the carrier gas stream is performed by saturating the carrier gas stream with said three components so that the carbon-bearing component, the promoter and the precursor of the carbon nanotube growth catalyst are in gas phase immediately after introducing them in the carrier gas stream.

3. The method according to claim 1, wherein hydrogen is used as the carrier gas.

4. The method according to claim 1, wherein carbon-bearing nonaromatic compounds, such as methane, ethane, propane, acetylene, ethylene, methanol, ethanol or mixtures thereof, are used as the carbon-bearing component.

5. The method according to claim 1, wherein sulfur-bearing compounds, such as thiophene, are used as the promoter.

6. The method according to claim 1, wherein volatile compounds of metals of group VIII, such as ferrocene or cobalt carbonyl, are used as the catalyst precursor.

7. The method according to claim 6, wherein content of the metal of group VIII in said mixture of the carrier gas, the carbon-bearing component, the promoter and the precursor of the carbon nanotube growth catalyst is 0.03 to 0.3% by weight.

* * * * *